United States Patent
Muddu et al.

(10) Patent No.: US 9,002,777 B1
(45) Date of Patent: Apr. 7, 2015

(54) SYSTEMS AND METHODS FOR HANDLING DATA

(75) Inventors: Sudhakar Muddu, Milpitas, CA (US); Christos Tryfonas, San Francisco, CA (US); Anurag Maunder, Fremont, CA (US)

(73) Assignee: EMC Corporation, Hopkinton, MA (US)

( * ) Notice: Subject to any disclaimer, the term of this patent is extended or adjusted under 35 U.S.C. 154(b) by 893 days.

(21) Appl. No.: 12/023,931

(22) Filed: Jan. 31, 2008

Related U.S. Application Data

(60) Provisional application No. 60/951,908, filed on Jul. 25, 2007, provisional application No. 60/951,912, filed on Jul. 25, 2007, provisional application No. 60/951,913, filed on Jul. 25, 2007, provisional application No. 60/951,915, filed on Jul. 25, 2007, provisional application No. 60/951,916, filed on Jul. 25, 2007.

(51) Int. Cl.
*G06F 17/30* (2006.01)
*G06F 17/00* (2006.01)

(52) U.S. Cl.
CPC .... *G06F 17/30867* (2013.01); *G06F 17/30961* (2013.01)

(58) Field of Classification Search
CPC ................ G06F 17/30867; G06F 17/30961
USPC ................................................. 707/706, 709
See application file for complete search history.

(56) References Cited

U.S. PATENT DOCUMENTS

| | | | | |
|---|---|---|---|---|
| 5,848,241 A * | 12/1998 | Misinai et al. | ................. | 709/213 |
| 6,516,337 B1 * | 2/2003 | Tripp et al. | ................... | 709/202 |
| 6,643,661 B2 * | 11/2003 | Polizzi et al. | ................. | 707/709 |
| 7,197,749 B2 * | 3/2007 | Thornton et al. | ............. | 718/101 |
| 7,752,207 B2 * | 7/2010 | Buzsaki et al. | ............... | 707/737 |
| 8,042,112 B1 * | 10/2011 | Zhu et al. | ....................... | 718/102 |
| 2002/0072974 A1 * | 6/2002 | Pugliese et al. | ................. | 705/14 |
| 2003/0237084 A1 * | 12/2003 | Neiman et al. | ................ | 718/102 |
| 2004/0196496 A1 * | 10/2004 | Klassen | ....................... | 358/1.15 |
| 2005/0262472 A1 * | 11/2005 | Wood et al. | .................... | 717/102 |
| 2006/0080389 A1 * | 4/2006 | Powers et al. | ................. | 709/203 |
| 2006/0161591 A1 * | 7/2006 | Huang et al. | .................. | 707/200 |

OTHER PUBLICATIONS

"U.S. Appl. No. 12/098,342", filed Apr. 4, 2008.
"U.S. Appl. No. 12/098,338", filed Apr. 4, 2008.
U.S. Appl. No. 11/933,111, filed Oct. 31, 2007.
U.S. Appl. No. 12/030,158, filed Feb. 12, 2008.
U.S. Appl. No. 12/030,153, filed Feb. 12, 2008.
U.S. Appl. No. 12/023,941, filed Jan. 31, 2008.

* cited by examiner

*Primary Examiner* — Tony Mahmoudi
*Assistant Examiner* — Mohammad Rahman
(74) *Attorney, Agent, or Firm* — Dergosits & Noah LLP; Todd A. Noah

(57) ABSTRACT

A method for handling files to timely provide reports concerning the files is disclosed. The method may include crawling (or enumerating) the files, to figure out how many files/data are to be processed and/or how much processing work is to be performed. The method may also include processing the files in batches. Identification information (e.g., filenames, file paths, and/or object identifiers) pertaining to the files may be sent to one or more queues for batch processing of the files. The method may further include generating a report after processing of a batch among the batches is completed. The report may be generated before subsequent processing of a subsequent batch is completed.

71 Claims, 10 Drawing Sheets

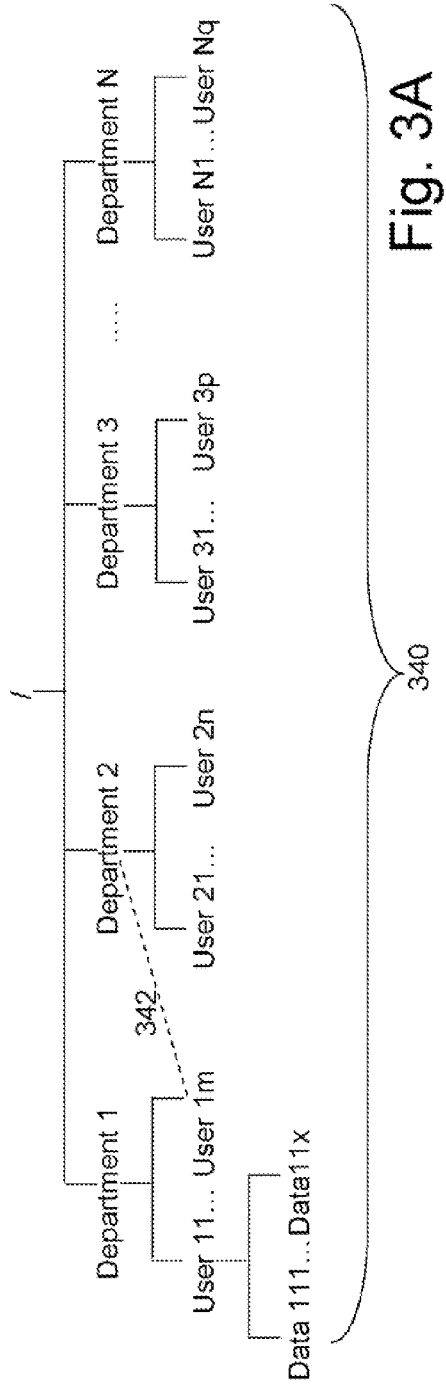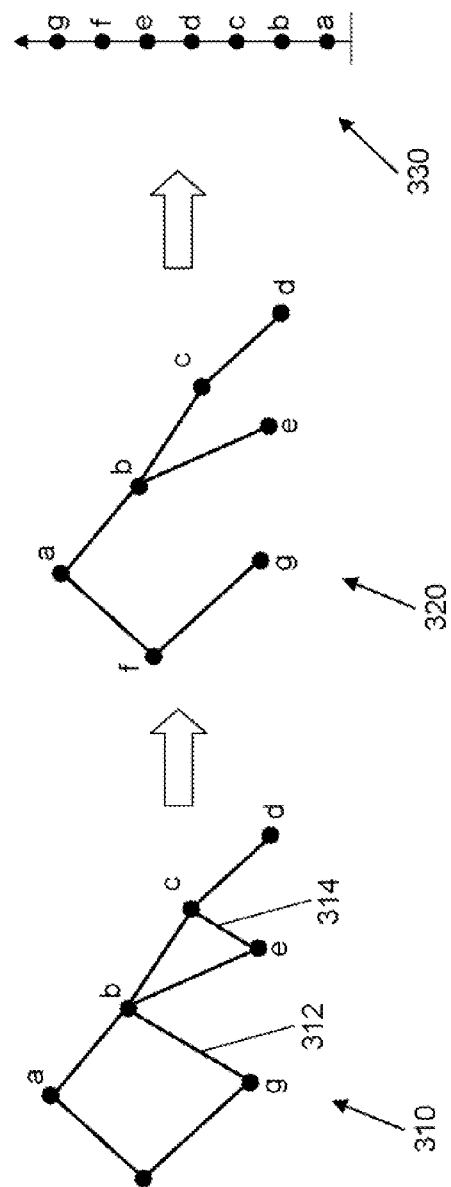
Fig. 3A
Fig. 3B

SYSTEMS AND METHODS FOR HANDLING DATA

The present invention claims priority under 35 USC 119(e) to a commonly owned provisionally filed patent application entitled "SYSTEMS AND METHODS FOR FACILITATING MANAGEMENT OF DATA," U.S. application Ser. No. 60/951,908, filed Jul. 25, 2007 by inventors Sudhakar Muddu, Christos Tryfonas, and Anurag Maunder; a commonly owned provisionally filed patent application entitled "SYSTEM AND METHODS FOR HANDLING DATA," U.S. application Ser. No. 60/951,912, filed Jul. 25, 2007 by inventors Sudhakar Muddu, Christos Tryfonas, and Anurag, Maunder: a. commonly owned provisionally filed patent application entitled "SYSTEM AND METHODS FOR SEARCHING DATA," U.S. application Ser. No. 60/951,913, filed Jul. 25, 2007 by inventors Sudhakar Muddu, Christos Tryfonas, and Anurag Maunder: a commonly owned provisionally filed patent application entitled "SYSTEMS AND METHODS FOR PERFORMING INTEGRATED SEARCHES WITH ACTIONS," U.S. application Ser. No. 60/951,915, filed Jul. 25, 2007 by inventors Sudhakar Muddu, Christos Tryfonas, and Anurag Maunder; and a commonly owned provisionally filed patent application entitled "SYSTEMS AND METHODS FOR MANAGING FILE MOVEMENT," U.S. application Ser. No. 60/951,916, filed Jul. 25, 2007 by inventors Sudhakar Muddu, Christos Tryfonas, and Anurag Maunder, all of which are incorporated herein by reference.

BACKGROUND OF THE INVENTION

The present invention relates to crawling/enumerating/classifying data for processing, management, and/or utilization of the data.

Organizations today face various challenges related to data/information management. For example, increased digitized content, retention of data due to regulatory requirements, the prevalence of productivity tools, the availability of data on communication networks, and other factors have been driving rapid growth of data volumes in datastores of organizations.

In addition to the tremendous data volumes, a substantial portion of data stored in the datastores may have heterogeneous attributes. Such data max not be able to be effectively managed utilizing a common schema and/or a database management system.

Further, the datastores may automatically create filesystem snapshots for files/data in order to avoid version skew when backing up volatile data sets. The filesystem snapshots may create duplicated versions of the same files, and may further expand the data volumes.

Existing data enumeration/classification mechanisms, or crawlers, may not be able to efficiently, effectively, and economically crawl through data with heterogeneous attributes. Further, existing crawlers may be able to operate for only hours and may not be able to enumerate/classify a large amount of data. Further, crawlers may not be able to continuously enumerate/classify a large amount of data without interruptions caused by factors such as, for example, network problems, power shut-down, maintenance of filers, etc.

As a result, most organizations have had difficulties enumerating/classifying data stored in datastores for efficient, effective, and economical utilization of the data.

SUMMARY OF INVENTION

One or more embodiments of the present invention relate to a method for handling files to timely provide reports concerning the files. The method may include crawling (or enumerating) the files, to figure out how many files/data are to be processed and/or how much processing work is to be performed. The method may also include processing the files in batches. Identification information (e.g., filenames, file paths, and/or object identifiers) pertaining to the files may be sent to one or more queues for batch processing of the files. The method may further include generating a report after processing of a batch among the batches is completed. The report may be generated before subsequent processing of a subsequent batch is completed.

The above summary relates to only one of the many embodiments of the invention disclosed herein and is not intended to limit the scope of the invention, which is set forth is the claims herein. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A illustrates a repository structure on which space-based crawling may be performed in accordance with one or more embodiments of the present invention.

FIG. 3B illustrates a method for mapping a repository structure into a tree structure and then into a list structure for space-based crawling in accordance with one or more embodiments of the present invention.

DETAILED DESCRIPTION OF EMBODIMENTS

Figure 1A:
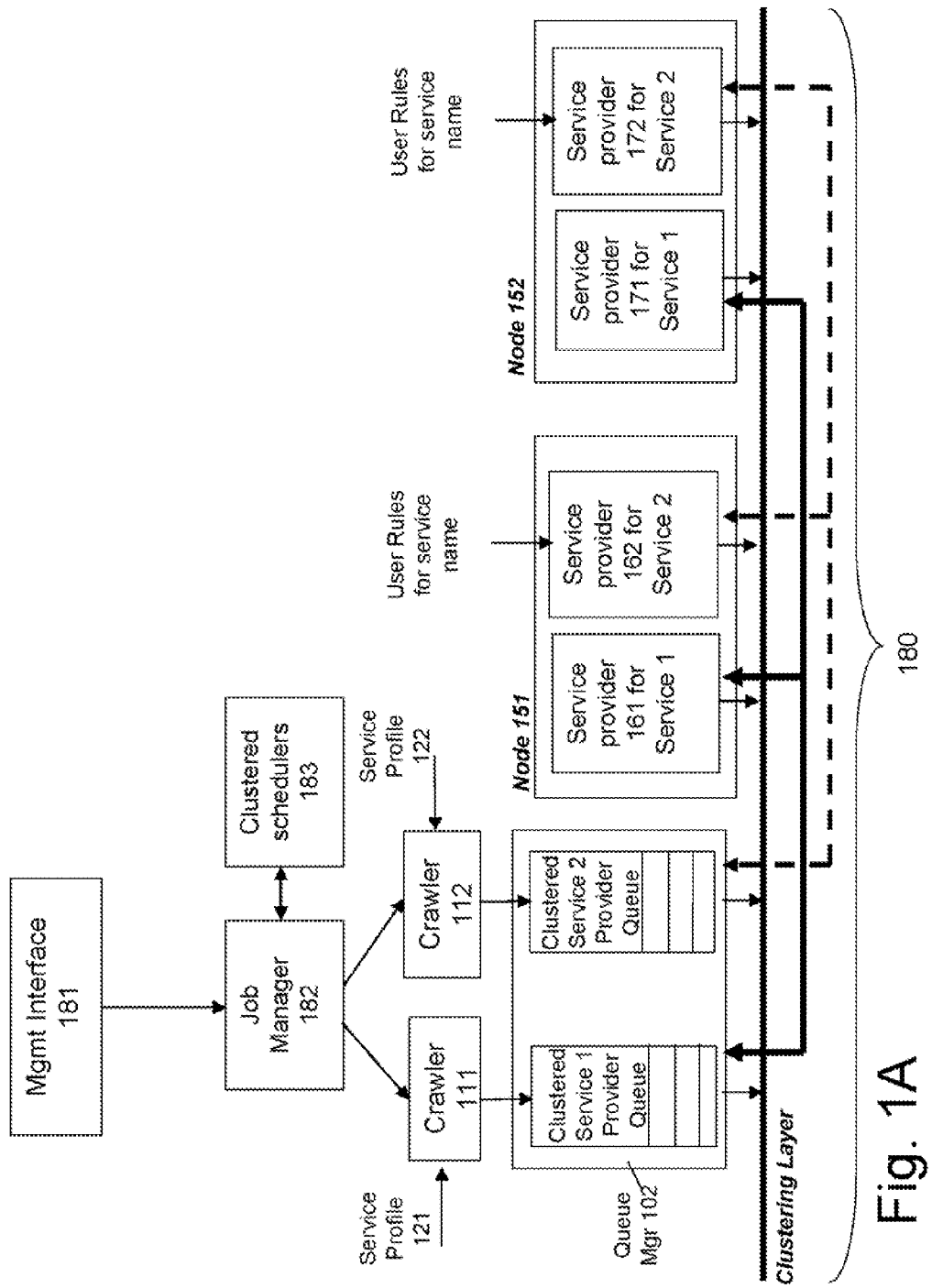
FIG. 1A shows a block diagram illustrating an arrangement for crawling data in accordance with one or more embodiments of the present invention.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention, Examples of such apparatus include a general-purpose computer and/or a dedicated computing device when appropriately programmed and may include a combination of a computer/computing device and dedicated/programmable circuits adapted for the various tasks pertaining to embodiments of the invention.

One or more embodiments of the present invention relate to a method for handling a plurality of files. The method may include enumerating at least a portion of the files using at least one crawler of a set of crawlers. The set of crawlers may include a first crawler and a second crawler.

The method may also include submitting a first set of identifiers associated with a first batch of the files to a first queue. The method may also include spawning a first set of service providers in a first set of nodes according to first workload associated with the first queue. The method may also include processing, using the first set of service providers, the first batch of the files The method may also include submitting a second set of identifiers associated with a second batch of the files to at least one of the first queue and a second queue. The method may also include spawning a second set of service providers in a second set of nodes according to second workload associated with the at least one of the first queue and the second queue. The method may also include processing, using the second set of service providers, the second batch of the files.

Several example embodiments of the invention are further described as follows:

1. Responses/Reports Based on Batch Processing

One or more embodiments of the present invention relate to a method for handling files to timely provide reports concerning the files. The method may include crawling (or enumerating) the files, to figure out how many files/data are to be processed and/or how much processing work is to be performed. The method may also include processing the files in batches. Identification information (e.g., filenames, file paths, and/or object identifiers) pertaining to the files may be sent to one or more queues for batch processing of the files. The method may further include generating a report after processing of a batch among the batches is completed. The report may be generated before subsequent processing of a subsequent batch is completed.

2. Time-Based Crawling

One or more embodiments of the present invention relate to a method for handling files in a datastore. The method may include determining at least one time attribute pertaining to the files. The method may also include dividing the files into a plurality of file groups according to the at least one time attribute. The method may further include crawling one or more file groups of the plurality of file groups. The one or more file groups of the plurality of groups may include multiple file groups, and multiple file groups may be crawled by a plurality of crawlers. The at least one time attribute may pertain to one or more of creation times, modification times, access times, and retention times of the files.

3. Space-Based/Tree-Based Crawling

One or more embodiments of the present invention relate to a method for handling files in a datastore. The method max include mapping a structure of the datastore into a tree structure. The method may further include mapping the tree structure into a list Structure. The method may further include crawling the files according to at least one of the tree structure and the list structure.

4. Filesystem Snapshot-Aware Crawling

One or more embodiments of the present invention relate to a method for crawling files in a filesystem snapshot. The method may include identifying a first set of tiles that have been changed since a previous filesystem snapshot that immediately precedes the filesystem snapshot. The method may include crawling the first set of files. The method may also include identified a second set of files that have not been changed since the previous filesystem snapshot. The method may also include disregarding the second set of files. The method may also include creating metadata pertaining to changes to first set of files made since the previous filesystem snapshot up to the filesystem snapshot.

5. Distributed Crawling

One or more embodiments of the present invention relate to a method for crawling files in a datastore. The method may include segmenting a tree structure in the datastore into a plurality of segments that include a first segment and a second segment. The tree structure may include the files. The method may also include crawling the first segment using a first node. The method may also include crawling the second segment using a second node. The method may further include sending a sub-segment of the first segment from the first node to the second node such that the sub-segment of the first segment may be crawled by the second node. The method may also include submitting directory information pertaining to at least one directory in the first segment from the first node to a directory queue. The method may also include transferring the directory information from the directory queue to the second node such that the at least one directory may be crawled by the second node. The first node and the second node may communicate with each other to transfer/receive crawling work.

6. Job Control with a Checkpoint Scheme

One or more embodiments of the present invention relate to a method for creating checkpoints for processing files in a datastore. The method may include store a first checkpoint that stores a first history. The method may also include create a second checkpoint when one or more conditions are met. The one or more conditions may include that a contiguous batch of data processing jobs have been completed since the first checkpoint, that a specified amount of files/data have been processed since the first checkpoint, and that a specified amount of time has elapsed since the first checkpoint. The method may further include discarding the first history.

7. Differential Crawling

One or more embodiments of the present invention relate to a method for identifying changed files in a datastore. The method may include adding a parameter for context data for files in the datastore. The method may also include recording values of the parameter for the files when enumerating the files. The method may further include comparing the values with at least one check value. For example, the parameter may be a "last seen time". The check value may represent a latest crawl start time. Accordingly, the method may be utilized in identifying deleted files.

8. Systems

One or more embodiments of the present invention relate to one or more systems for implementing one or more of the aforementioned methods. For example, one or more embodiments of the invention may relate to a system for handling a plurality of files. The system may include a set of queues including at least a first queue and a second queue.

The system may also include a set of crawlers configured to enumerate at least a portion of the files. The set of crawlers including at least a first crawler and a second crawler. The set of crawlers may also be configured to submit a first set of identifiers associated with a first batch of the files to the first queue. The set of crawlers may also be configured to submit a second set of identifiers associated with a second batch of the files to at least one of the first queue and the second queue.

The system may also include a first set of nodes configured to spawn a first set of service providers according to first workload associated with the first queue. The first set of service providers may be configured to process the first batch of the files.

The system may also include a second set of nodes configured to spawn a second set of service providers according to second workload associated with the at least one of the first queue and the second queue. The second set of service providers may be configured to process the second batch of the files.

The features and advantages of the invention may be better understood with reference to the figures and discussions that follow.

1. Responses/Reports Based on Batch Processing

FIG. 1A shows a block diagram illustrating an arrangement 180 for crawling data in accordance with one or more embodiments of the present invention. Arrangement 180 may include a plurality of clustered nodes (e.g., computers contains applications and/or logical placeholders or memory blocks for data), such as node 151 and node 152, for crawling and/or processing (or performing one more services on) selected objects/files. The clustered arrangement may facilitate service distribution, load balancing, redundancy, failover, etc. Each node may include one or more workflow manager programs, such as service provider 161 for service 1, service provider 162 for service 2, service provider 171 for service 1, service provider 172 for service 2, corresponding to the one or more services.

The one or more services may include, for example, one or more of the following: data integrity of file systems at the object (file) level, nearline (e.g., copying of the object/file to another location in one or more file systems), cataloguing (often referred to as shallow or basic classification, e.g., extracting the user/environmental parameters of selected documents/files present at the remote file systems and creating a unique fingerprint of the document), and deep parsing (e.g., analyzing the objects/files based on a set of keyword-based or regular-expression-based rules).

The distribution of the objects/files for processing according to the functions above may be done utilizing a set of centralized queues managed by a queue manager 102. Queue manager 102 distributes the load in separate service providers that manage the workflow.

A user may enter a service request through a management interface 181 into a job manager 182 that utilizes a set of clustered schedulers 183 associated with the clustered nodes. Job manager 182 may be configured to manage and/or control various types of enumeration and processing for files. An election mechanism may decide which scheduler is the active one in the cluster. A node that has the active scheduler may be the one that initiates the service handling and may be referred as the "master node". Although all of the node schedulers may be aware of the service jobs that need to be performed, only one scheduler may initiate the jobs.

A service request may be given in the form of a crawling request that needs to perform a particular function (e.g. data integrity and/or basic/deep classification) and the schedule that the crawler will operate on. The schedule may have two different sub-schedules: an on-schedule that is used to initiate the service job and an off-schedule that is used to stop the job. A time duration may be attached along with the on-schedule.

A service request may have the following additional attributes: a directory/mount point to operate, a filter of what files and/or directories to exclude, a service profile (e.g., service profile 121 or 122) that determines what functionality to be performed, etc. The service profile may include, for example, Basic Classification, Deep Classification, Data Integrity, etc.

A crawler (e.g., crawler 111 or crawler 112) may represent a program or logic that enumerates data and/or keeps track of the state of data, e.g., what was the last filename that was completed/services when the off-schedule got activated. In the case that an off-schedule becomes active, the crawler may record the last filename that was committed and clear the appropriate service queue in queue manager 102. A crawler may also keep track of whether a filename was modified from the previous crawling in the same file system. The state may need to be synchronized across the cluster in preparation of a master node failure.

A crawler max be associated with a given service job and may follow a producer/consumer model with the components that implement the service functionality. A crawler may traverse a directory/mount point and may insert all the filenames, including pathnames and file attributes and service name (or identifier, i.e., ID) that match the file filter associated with the service job, into a service queue (flow-control using a busy-wait model may be employed to prevent overflowing the service producer queue).

A service provider in every node across the cluster that can service the service queue may pull files/objects (e.g., filenames, file paths, and/or object identifiers) from the corresponding queue of the master node (the node that runs the scheduler) in batches and services them from its local node. Accordingly, service load may be (uniformly) distributed across the cluster without the need of storage segmentation of the service job. In the case of a node failure, the failed node may not continue to participate in servicing the service provider queue and, therefore, the load may be amortized across the rest of the nodes in the cluster.

In order to make sure that, in the case of a node failure, all the files that have been pulled from the service provider queue, have been serviced, the queue manager 102 may have semantics to mark files for processing and later committing the files using appropriate messages coming from the node that marked the appropriate files for service processing.

The services modules for the particular services (e.g. data integrity, classification) run as background daemons that periodically request workloads (e.g. 20 files per request to the service producer queue) from the appropriate services queue. Based on the service names or service IDs, a given module may use a specific user configuration file. For example, in the case of a classification service, a user can have two types of rules (how a file will be parsed and context data will be tagged), based on the mount point (directory for files to be processed) or some other filesystem metadata parameter.

A workflow manager may be launched on demand to process objects for a specific job queue and service profile combination. A workflow manager may receive job requests from a queue manager 102. A workflow manager may manage one or more service providers to perform the processing (e.g., classification) as required by the service profile (e.g., service profile 121 or 122), and may communicate the outcome of the processing back to the queue manager 102.

The processing may be performed by calling APIs from a service library. If a given job requires data to be moved from a source storage, a service provider may request a data mover program to transfer the data to a temporary local storage. While the service provider is processing the data from the temporary local storage, the workflow manager may get the next job request (or next batch of work units) from queue manager 102, and may submit the job request to the data mover in an attempt to start a pipeline of I/O and processing.

A workflow manager may provide the processing of a job request based on a service profile (e.g., service profile 121 or 122) specified during crawling performed by crawlers (e.g., crawler 111 or 112). The workflow manager may opens the context data of a file that is undergoing the processing and may pass the file handle to each service provider as needed.

According to the clustered arrangement, the processing pertaining to a particular service (e.g., service 1) may be distributed among a plurality of nodes (e.g., nodes 151 and 152). The nodes may retrieve data independently, and there may be no congestion of data flow. Since nodes may perform the processing in parallel, arrangement 180 may provide high efficiency. Further, the number of nodes may be adjusted according to the requirement of data processing. For example, if more data need to be processed utilizing a particular service, more nodes may be added. Advantageously, arrangement 180 may be flexible and scalable in response to the volume of data to be processed.

Figure 1B:
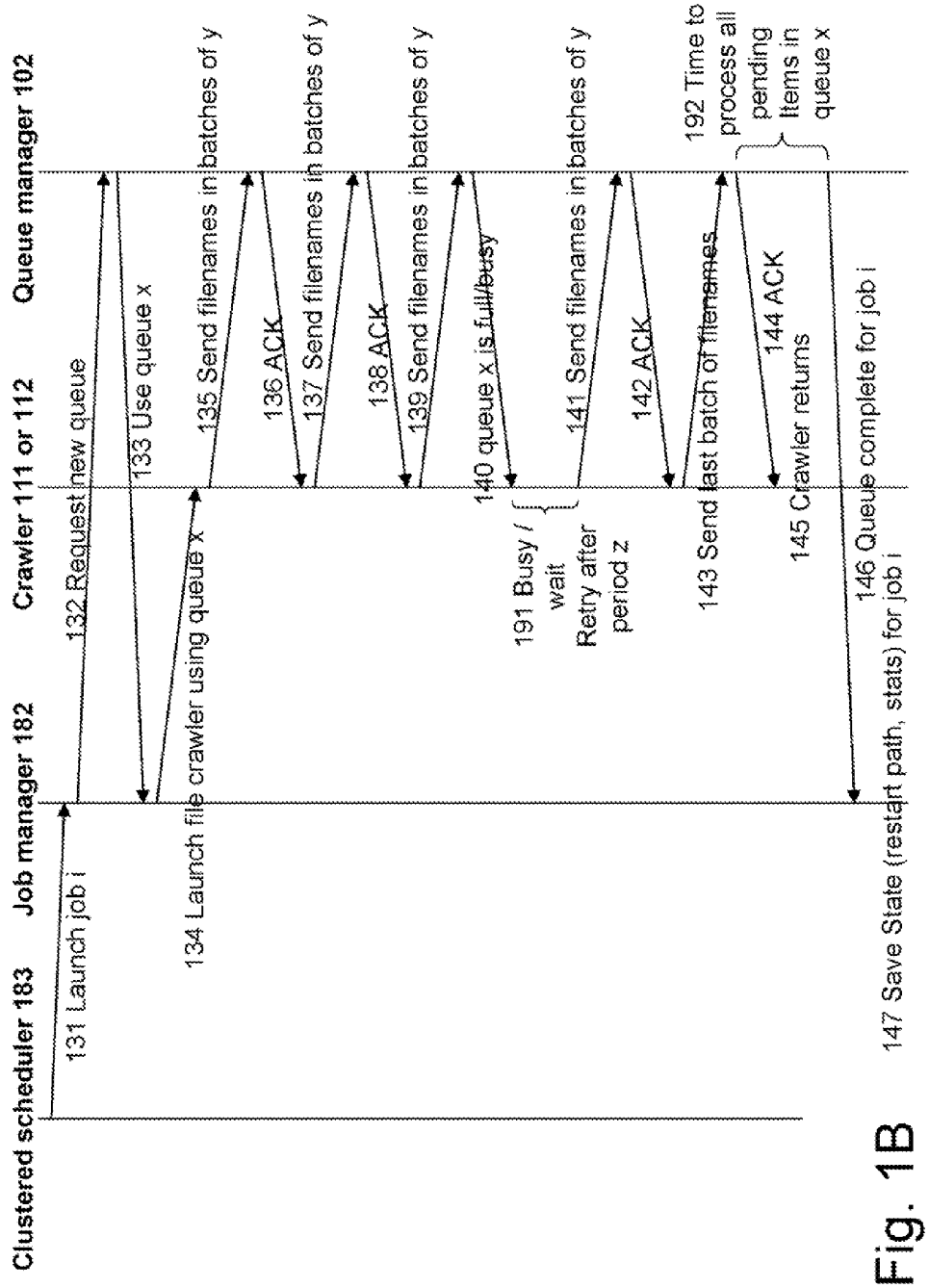
FIG. 1B illustrates a data and control flow of the arrangement illustrated in the example of FIG. 1A in accordance with one or more embodiments of the present invention.

FIG. 1B illustrates a data and control flow of arrangement 180 illustrated in the example of FIG. 1A in accordance with one or more embodiments of the present invention.

At step 131, employing clustered schedulers 183, an administrator may schedule a job i to crawl over the data directory, for example, for deep classification and surveillance.

At step 132, job manager 182 may send a request for a new queue to queue manager 102.

At step 133, queue manager 102 may respond with a queue ID, e.g., queue x.

At step 134, job manager 182 may schedule the crawling of the specified data directory for the period specified by the administrator. At the scheduled time job i may be fired and a crawler 111 or 112 may be initiated to list all the files in the specified data directory.

At subsequent steps, for example, steps 135, 137, and 139, lists of files (e.g. filenames, file paths, and/or object/file identifiers) may be submitted to queue manager 102 in batches of y (with y representing the number of files). At steps 136 and 138, queue manager 102 may respond with acknowledgement messages. Queue manager 102 may announce to the cluster that queue manager 102 has some (busy) queues that require processing. One or more service monitors in a set of one or more nodes which are not busy may respond to queue manager 102 and may spawn a set of one or more service providers, according to workload associated with queue x. Queue manager 102 may assign job i to the one or more nodes. The workflow manager(s)/service provider(s) may in turn receive the task, move the data, and process the data based on the specified profile and may request for more job(s).

At some step(s), such as step 140, queue manager 102 may notify crawler 111 or 112 that queue x is full/busy. Queue manager 102 may also request crawler 111 or 112 to try later.

Subsequently, at step 191, crawler 111 or 112 may wait for queue x to become available and may retry after period z.

At step 141, crawler 111 or 112 may submit lists of files (e.g. filenames, file paths, and/or object identifies) in batch of y to queue manager 102. At step 143, crawler 111 or 112 may submit the last batch of filenames to queue manager 102. At steps 142 and 144, queue manager 102 may respond with acknowledgement messages. Queue manager 102 may announce to the cluster that queue manager 102 has some (busy) queues that require processing. One or more service monitors in a set of one or more nodes which are not busy may respond to queue manager 102 and may spawn a set of one or more service providers, according to workload associated with queue x. Queue manager 102 may assign job i to the one or more nodes. The workflow manager(s)/service provider(s) may in turn receive the task, move the data, and process the data based on the specified profile and may request for more job(s).

At step 145, crawler 111 or 112 may return from the file directory.

At step 192, all pending items in queue x may be processed.

At step 146, queue manager 102 may notify job manager 182 that job i is completed.

At step 147, job manager 182 may save the state (e.g., restart path, statistics, etc.) for job i.

Multiple queues may be assigned for a job. Multiple crawlers may be utilized for a job. In addition, heterogeneous repositories may be crawled.

Advantageously, according to the data and control flow, requirements for storage and processing resources may be minimized, since jobs are assigned and service providers are spawned according to availability of nodes and workload in the queue as needed. There may be no need for a significant amount of redundant nodes.

Further, both response time and processing completion time for processing data may be minimized. Response time may be minimized at least because jobs may be divided into batches, and the processing results may be provided/reported as processing of each batch is completed. Processing completion time may be minimized at least because parallel processing performed by multiple nodes.

2. Time-Based Crawling

Figure 2:
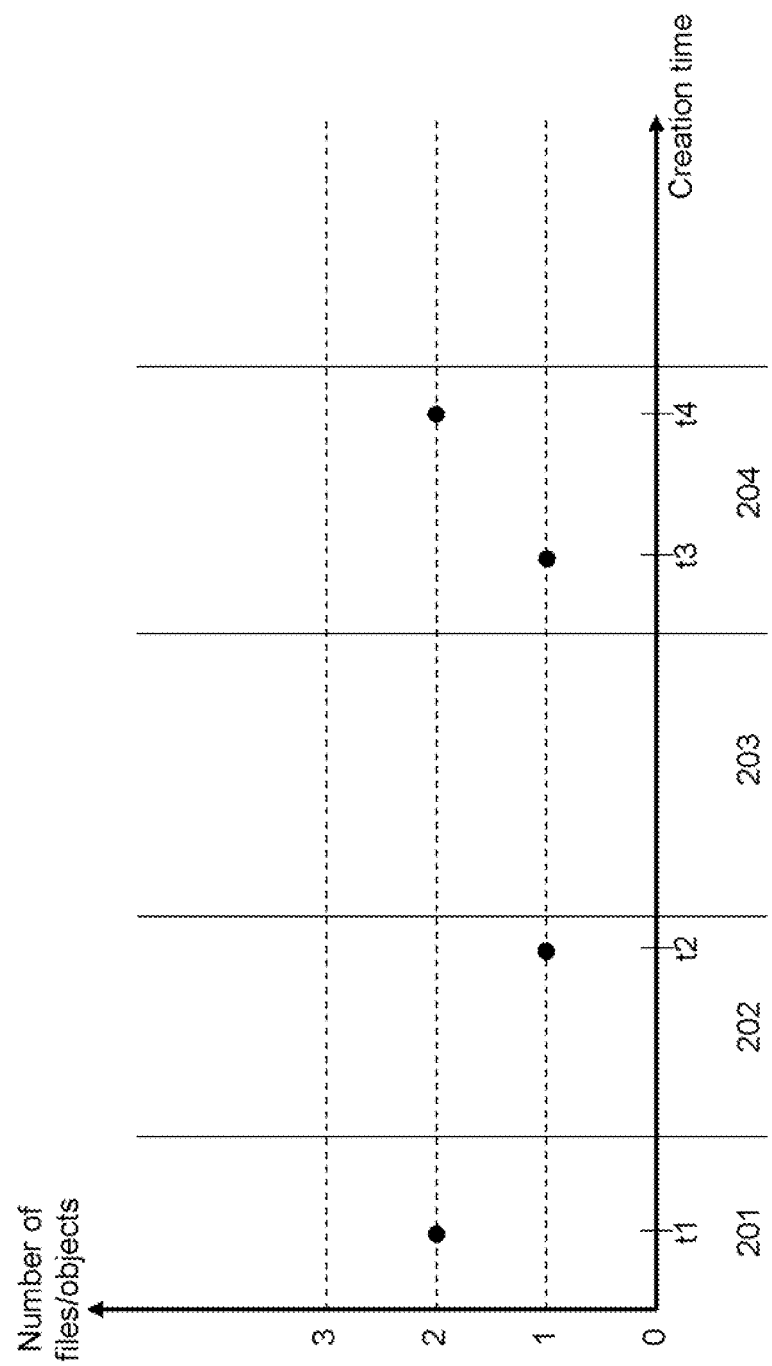
FIG. 2 illustrates a file grouping scheme for time-based crawling in accordance with one or more embodiments of the present invention.

FIG. 2 illustrates a file grouping scheme for time-based crawling in accordance with one or more embodiments of the present invention. Files/objects in a repository may have various time attributes. For example, a file may have one or more of the following time attributes: creation time, modification time, access time (e.g., when the file is read), retention time (e.g., expiration date/time of the file), etc. A certain time attribute, e.g., creation time, may be selected. Files may be grouped according to various time intervals, e.g., by job manager 181 illustrated in the example of FIG. 1A. In the example of FIG. 2, the horizontal axis of the file grouping scheme represents creation time of files, and the vertical axis of the file grouping scheme represents the number of files created at a certain creation time. As illustrated in the example of FIG. 2, files may be grouped according to time intervals 201-204, etc. For example, the time interval 201 file group includes 2 file created in t1, the time interval 202 file group includes 1 file created at t2, the time interval 203 file group includes no file, the time interval 204 file group includes 1 file created at t3 and 2 files created at t4, etc.

Accordingly, multiple crawlers may be assigned, e.g., by job manager 181 illustrated in the example of FIG. 1A, to crawl the various time interval file groups. For example, crawler 111 illustrated in the example of FIG. 1 may be assigned, e.g., by job manager 181, to crawl the time interval 201 and time interval 202 file groups, and crawler 112 illustrated in the example of FIG. 1 may be assigned to crawl the time interval 203 and time interval 204 file groups. Different nodes (and service providers) may be assigned to process or provided services to the different time interval file groups. For example, nodes 151 and 152 illustrated in the example of FIG. 1A may be assigned to process the time interval 201 and the time interval 204 file groups, respectively. Workload may be distributed according to available storage and/or processing resources. Advantageously, efficiency of file/data crawling and processing may be significantly improved.

The time intervals may have a fixed length or may have different lengths. The time intervals may be determined on factors such as file amount, data amount, service profiles, efficiencies of crawlers, processing capabilities of nodes, etc. for each time interval file groups. For example, multiple time interval file groups may have the same or similar amount of data such that work load may be substantially equally distributed among crawlers and/or nodes.

Time interval file groups identified as insignificant according to a set of rules, e.g., files modified in a particular month, may be skipped without being crawled and/or processed. Time interval file groups that contain no files or contain only files identified as insignificant (e.g., according to a set of rules) may be skipped without being crawled and/or processed. Accordingly, file/data crawling and/or processing may be performed in a compressed manner. Advantageously, efficiency may be further improved, and resources may be conserved.

The time interval file groups and files may be mapped into a tree structure for spaced-based/tree-based crawling. The tree structure may be further mapped into a list structure.

3. Space-Based/Tree-Based Crawling

FIG. 3A illustrates a repository structure on which space-based crawling may be performed in accordance with one or more embodiments of the present invention. As illustrated in the example of FIG. 3A, repository 340 may include various departments. Each department may include a plurality of users. A user may be associated with a plurality of data sets (e.g., financial data, performance data, etc.). It is possible that a user may belong to multiple dependents. For example, user 1 may belong to both department 1 and department 2. In one or more embodiments, link 342 may be removed such that structure 340 may be mapped into a tree structure with only parent-child dependency without any circular or looped structure.

In general, a file system may be hierarchical and may have a tree structure without being further mapped. However, other types of repositories, as illustrated by repository 340, may contain circular or looped structures that need to be mapped into a tree structure.

FIG. 3B illustrates a method for mapping a repository structure 310 into a tree structure 320 and then into a list structure 330 for space-based crawling in accordance with one or more embodiments of the present invention. In one or more embodiments, space-based crawling may include mapping any type of repository structure into a tree structure. One or more embodiments may further include mapping a tree structure into a list structure.

As illustrated in the example of 3B, repository structure 310 may include directories/files a, b, c, d, e, f, and g. Repository structure 310 may include link 312 such that a loop including directory/file(s) a, f, g, and b may be formed. Repository structure 310 may further include link 314 between directories/files c and e such that a loop including directory/file(s) b, c, and e may be formed. Link 312 and link 314 may be removed such that repository structure 310 may be mapped into tree structure 320. Links to be removed may be determined based on one or more optimization algorithms, such as shortest path, minimum cost, etc.

Accordingly, with tree structure 320, there is no looped structure among the directories/files such that one or more effective and efficient control and search algorithms may be applied. In one or more embodiments, advantageously, a single crawler/algorithm may be utilized with no need of changing crawlers/algorithms.

Tree structure 320 may be further mapped into list structure 330 for a sequential search/crawling. The mapping may be performed utilizing one or more search algorithms, such as depth-first search (DFS) algorithm. DFS may represent an algorithm for traversing or searching a tree, tree structure, or graph. Intuitively, one starts at the root (selecting some node as the root in the graph case) and explores as far as possible along each branch before backtracking. A graph may represent a kind of data structure, specifically an abstract data type (ADT), which includes a set of nodes and a set of edges that establish relationships (connections) between the nodes.

Since all repository structures (represented by various graphs) may be mapped into a tree structure, circular or looped dependency may be eliminated such that repetition may be avoided, and efficiency of crawling may be advantageously improved. Further, since all graphs are mapped into tree structure, only one type of crawler may be needed for various types of repositories. Arrangements of crawling may be simplified. Further, crawling, may be performed across various types of repositories for a long period of time without the need for adjusting or changing crawlers. The may be no need to be change mechanisms, such as Start, suspend, resume, and stop mechanisms, of a crawler for crawling repositories or filesystems of various types.

Figure 4:
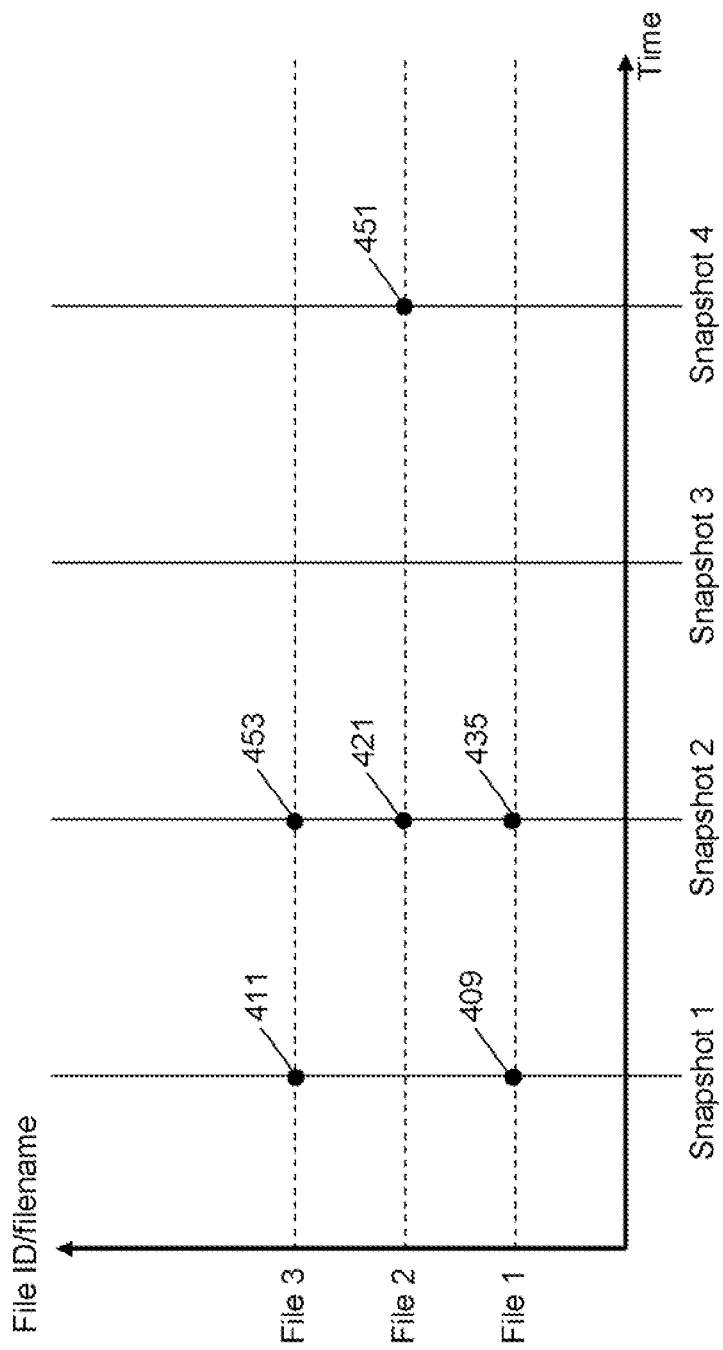
FIG. 4 illustrates a schematic representation of occurrences of example changes to files identified in filesystem snapshots and utilized in filesystem snapshot-aware crawling in accordance with one or more embodiments of the present invention.

FIG. 4. Filesystem Snapshot-Aware Crawling

FIG. 4 illustrates a schematic representation of occurrences of changes to files identified in filesystem snapshots and utilized in filesystem snapshot-aware crawling in accordance with one or more embodiments of the present invention. The files may be, for example, in a list structure, such as list structure 330 illustrated in the example of FIG. 3B.

In computer file systems, a filesystem snapshot may represent a copy of a set of files and/or directories as the set of files and/or directories were at a particular point in the past. Filesystem snapshots may be useful for avoiding version skew when backing up volatile data sets, such as tables in a busy database or the folder store of a busy mail server. However, even a small file system with 10 million files can result into multibillion files across all filesystem snapshots, because the filesystem snapshots may include/represent duplicates (same file version). A file may have up to 256 filesystem snapshots. As a result, it may be difficult or impossible utilizing existing techniques to classify files across the filesystem snapshots. In general, filesystem snapshots are automatically deleted (rolled over and the associated metadata may be deleted. Further, filesystem snapshot names are typically relative and are not absolute; it may be difficult to identify a file belonging into a particular filesystem snapshot since its filepath changes over time.

In accordance with one or more embodiments of the present Invention, a filesystem snapshot/aware crawler may navigate the directory structures of the various filesystem snapshot file systems by cross/correlating information to create a minimum amount of metadata for only the unique files without creating metadata for duplicated or same version of the same files. The crawler may select which filesystem snapshot to crawl. Even while the filesystem snapshots are being rolled over, the crawler may update file path and/or file names of files to be crawled in response to the changes of the filesystem snapshot names. The crawler may also specify the time range, such as from a fourth time to a fifteenth time or from a second filesystem snapshot to a ninth filesystem snapshot, to crawl. The crawler may also start crawling from a particular filesystem snapshot, such as an eleventh filesystem snapshot, onward. The metadata created may pertain to changes associated with different versions of files. Accordingly, the metadata may be agnostic on the order that the crawling takes place.

In the example of FIG. 4, the horizontal axis may represent a time, and the vertical axis may represent file identification information, e.g., file names. For example, changes of file 1 are recorded and/or identified in filesystem snapshot 1 and filesystem snapshot 2 with associate versions 409 and 435, respectively, of file 1. Changes of file 2 may be recorded and/or identified in filesystem snapshot 2 and filesystem snapshot 4 associated with versions 421 and 451, respectively, of file 2. Changes of file 3 may be identified in filesystem snapshot 1 and filesystem snapshot 2 with associated versions 411 and 453, respectively, of file 3. File 2 has not been changed in filesystem snapshot 1.

In one or more embodiments, filesystem snapshot 1, the crawler may crawl (or enumerate) only version 409 of file 1 and version 411 of file 3, but may not enumerate file 2. For filesystem snapshot 1, the crawler may submit only changes associated with version 409 of file 1 and version 411 of file 3 to a queue for subsequent processing, without submitting information related to file 2. As an example, the changes may include one or more changes in one ore more directory names pertaining to file 1 and/or file 3. The queue may already contain information associated with earlier versions of the files. Accordingly, only changes are needed for processing the files.

When crawling/enumerating file 1, metadata for versions 409 and 435 may be created. The metadata may be pertaining to changes associated with versions 409 and 435. There may be no metadata created for file 1 for filesystem snapshot 3 and filesystem snapshot 4, given that there are no changes to file 1 identified in filesystem snapshots 3 and 4. When crawling/enumerating file 2, metadata may be created for versions 421 and 451 associated with changes identified in filesystem snapshots 2 and 4. There may be no metadata created for file 2 for filesystem snapshots 1 and 3. For file 3, metadata may be created for version 411 and version 453 associated with changes identified in filesystem snapshot 1 and filesystem snapshot 2. There maybe no metadata created for file 3 for filesystem snapshots 3 and 4, given no changes to file 3 are identified in filesystem snapshots 3 and 4.

Advantageously, the amount of metadata created may be minimized. No metadata is created if no change to a file is made. Accordingly, classification and discovery of files across filesystem snapshots may be enabled Further, filesystem snapshots to be crawled may be selected, and the number of filesystem snapshots to be crawled may be reduced. As a result, efficiency of crawling may be significantly improved. Computing and/or storage resources may be conserved.

5. Distributed Crawling

Figure 5A:
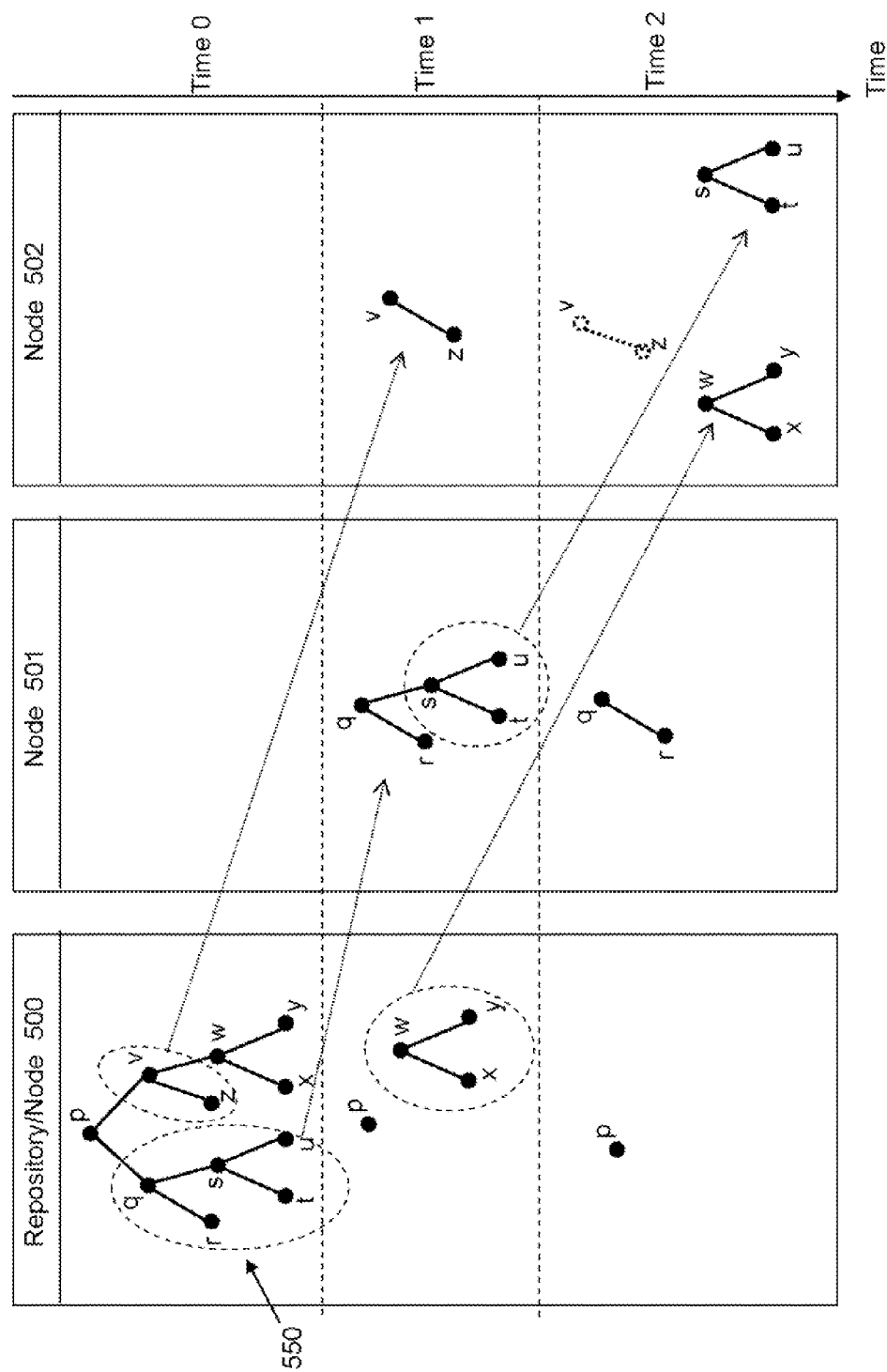
FIG. 5A illustrates a schematic representation of a method of distributed crawling in accordance with one or more embodiments of the present invention.

FIG. 5A illustrates a schematic representation of a method of distributed crawling in accordance with one or more embodiments of the present invention. At time 0, repository/node 500 may contain a tree structure 550 to be crawled. Tree structure 550 may include directory p, subdirectories q, s, v, and w, and associated files, including files r, t, u, z, x, and y. Tree structure 550 may be segmented into sub-trees (or directories/subdirectories) for crawling.

At time 1, node 501 may receive directory q for crawling. Directory q includes file r and subdirectory s containing files t and u. Node 502 may receive a branch of directory v, including file z for crawling. Directory w containing files x and y may remain in repository/node 500. Directory p may contain no file and may remain in repository/node 500.

At time 2, node 502 may have completed crawling the branch of directory v that contains file z. With free capacity, node 502 may request more crawling work. Node 502 may receive directory s, containing files t and u from node 501. Node 502 may also receive directory w, containing files x and y from repository/node 500.

In one or more embodiments, crawling work is distributed among a plurality of nodes for crawling. With parallel crawling, efficiency may be significantly improved. Further, each node may request further crawling work whenever there is free capacity. Accordingly, resources may be optimally utilized. Advantageously, computing and storage resources may be conserved.

Figure 5B:
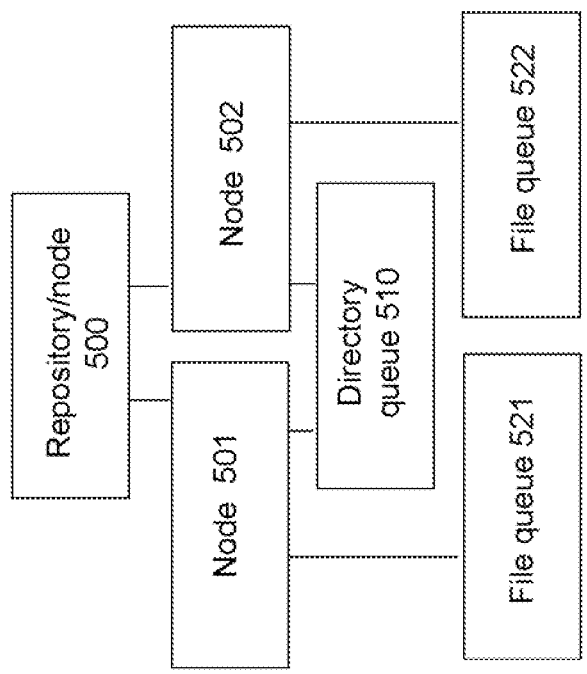
FIG. 5B illustrates a block diagram of components for distributed crawling in accordance with one or more embodiments of the present invention.

FIG. 5B illustrates a block diagram of components for distributed crawling in accordance with one or more embodiments of the present invention. The components may include repository/node 500 containing data to be crawled. Repository/node 500 may be connected to node 501 and node 502 for crawling the data. Node 501 may connect to file queue 521 such that node 501 may submit crawled/enumerated files to file queue 521 for subsequent processing. Node 502 may connect to file queue 522 such that node 502 may submit crawled/enumerated files to file queue 522 for subsequent processing. Both node 501 and node 502 may connect to directory queue 510 such that each node 501 and node 502 may submit directories to directory queue 510 for crawling.

Figure 5C:
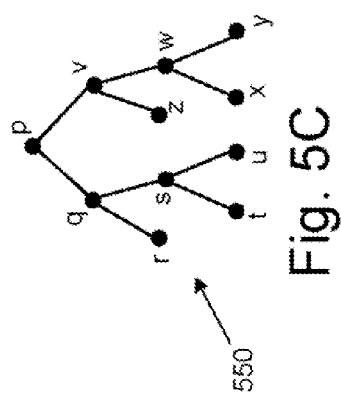
FIG. 5C shows the tree structure illustrated in the example of FIG. 5A to facilitate reference and discussion.

FIG. 5C shows tree structure 550 illustrated in the example of FIG. 5A to facilitate reference and discussion.

Figure 5D:
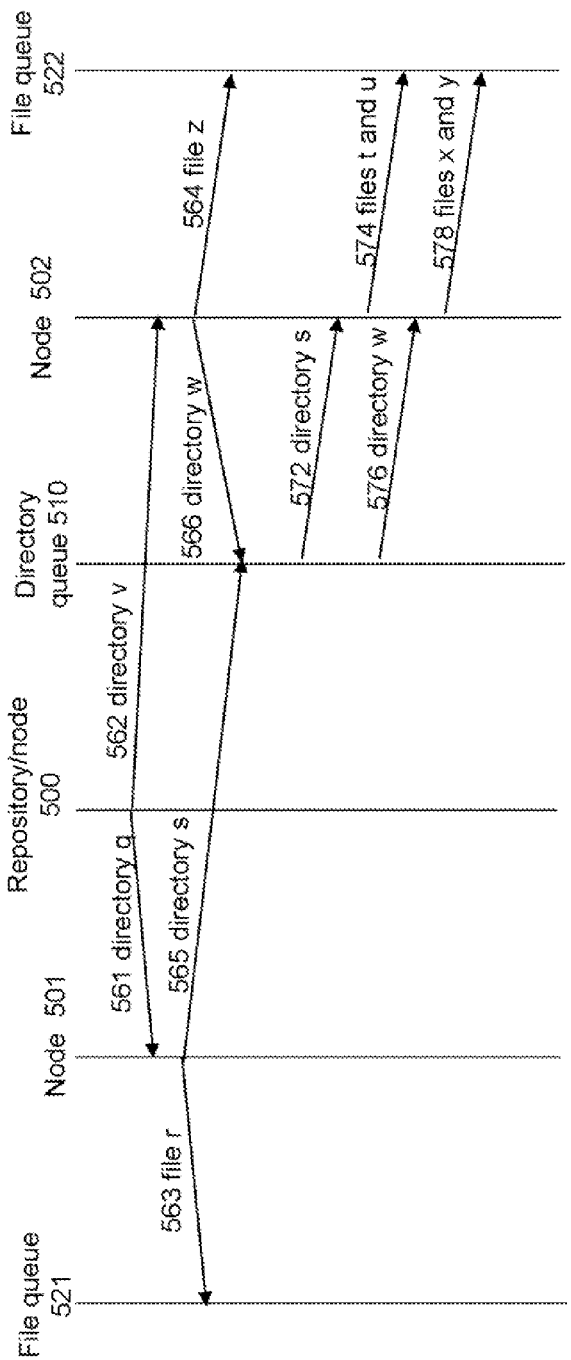
FIG. 5D illustrates a data flow of distributed crawling in accordance with one or more embodiments of the present invention.

FIG. 5D illustrates a data flow of distributed crawling in accordance with one or more embodiments of the present invention. At step 561, repository-node 500 may send directory q to node 501 for crawling. Node 501 may examine directory q and determine that directory q includes file r and directory s. At step 563, node 501 may submit file r to file queue 521 for subsequent processing. At step 565, node 501 may send directory s to directory queue 510 for further crawling.

At step 562, repository-node 500 may send directory v to node 502 for crawling. Node 502 may examine directory v and may determine that directory v includes file z and directory w. At step 564, node 502 may submit file z to file queue 522 for subsequent processing. At step 566, node 502 may send directory w to directory queue 510 for further crawling.

Given that node 502 has free capacity, at step 572, directory queue 510 may send directory s to node 502 for crawling. At step 574, node 502 may enumerate directory s and submit files t and u to file queue 522 for subsequent processing.

With free capacity, node 502 may further request crawling work. At step 576, directory queue 510 may send directory w to node 502 for crawling. Node 502 may enumerate directory w. At step 578, node 502 may submit files x and y to file queue 522 for subsequent processing.

In one or more embodiments, further with time-based crawling, different time interval file groups may be crawled by different nodes in a distributed manner.

As can be appreciated from the above discussion with reference to FIG. 5A to FIG. 5D, in one or more embodiments, nodes, such as nodes 500, 501, and 502, may dynamically communicate with one another or each other to transfer and receive crawling work. Accordingly, the workload may be dynamically and optimally distributed. Advantageously, resources may be optimally utilized, and efficiency may be optimized.

6. Job Control with a Checkpoint Scheme

One or more checkpoints may be created by a job manager, such as job manager 182 illustrated in the example of FIG. 1, for job control. A checkpoint may represent state information pertaining to files.

Figure 6A:
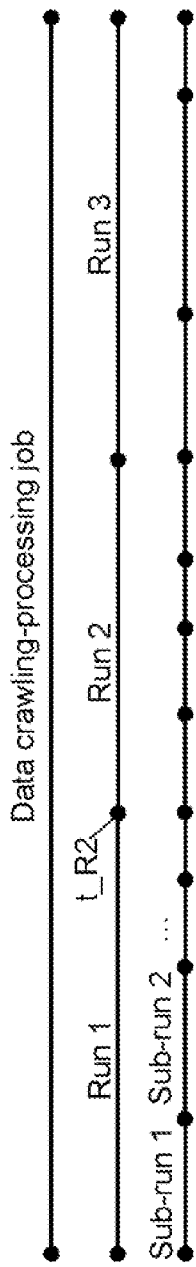
FIG. 6A illustrates a schematic representation of a data crawling-processing job for a repository in accordance with one or more embodiments of the present invention.

FIG. 6A illustrates a schematic representation of a data crawling-processing job for a repository in accordance with one or more embodiments of the present invention. The data crawling processing job may include a plurality of runs, such as run 1, run 2, and run 3, as illustrated in the example of FIG. 6A. A run may represent a complete traversal (including crawling and processing) of a tree structure in the repository. A run may be further divided into multiple sub-runs. A sub-run may represent a partial crawling-processing of a tree structure. For example, a sub-run may be limited to a certain amount of time, such as four hours. Multiple runs may be needed for a data crawling-possessing job, for example, given changes in the repository. When a run, for example run 1, is completed, a search report may be generated. A subsequent run, such as run 2, may process only changed files in the repository with changes made since the completion of run 1.

One or more job control actions may be performed during the data crawling-processing job. The one or more job control actions may include one or more of the following: "suspend", "resume", "start", "stop", "restart", "show failures", and "history", described as follows:

"Suspend" may include stop the crawl, finish processing all files in the queue, and create a checkpoint (or updating the effective checkpoint).

"Stop" may include stop the crawl, save the last checkpoint, and discard all files in the queue.

"Resume" may include start a suspended crawl from the last checkpoint.

"Start" may include start an idle job from the last checkpoint. "Restart" may include start a craw/processing job from the last checkpoint and submit files to the queue that has been cleared as a result of the "Stop".

"Show failures" may include show a list of files that have one or more exceptions, such as one or more of password protected, unknown format, corrupted file, time-out, etc.

"History" may include the number of files processed, the number of files failed, the start time, the stop time, the effective checkpoint, and/or a plurality of checkpoints, run 1 statistics, run 2 statistics, and other statistics, etc.

Figure 6B:
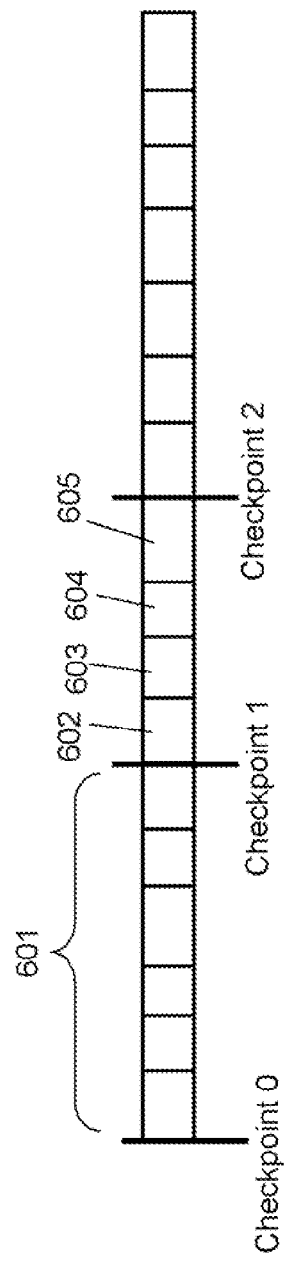
FIG. 6B illustrates a schematic representation of a plurality of data crawling-processing jobs for illustrating checkpoint creation in accordance with one or more embodiments of the present invention.

FIG. 6B illustrates a schematic representation of a plurality of data crawling-processing jobs for illustrating checkpoint creation in accordance with one or more embodiments of the present invention.

In one or more embodiments, one or more checkpoints (e.g., a plurality of checkpoints) may be created for an in-order crawl/enumeration, wherein files/objects are crawled (or enumerated) according to a specific order.

In one or more embodiments, one or more checkpoints (e.g., a plurality of checkpoints) may be created for out-of-order processing. For example, a random group of object/files may be kept in a repository. The objects/files may be enumerated based on different available attributes, such as one or more of time attributes, file names, file paths, etc. Further, even if object/files are enumerated in order, the processing of the object/files may still be out of order, given distributed processing (e.g., discussed with reference to FIGS. 5A-D) of the object/files. The one or more checkpoints may need to be kept consistent and synchronized across different nodes.

In the example of FIG. 6B, jobs 601 may represent jobs that have been completed. Accordingly, checkpoint 1 (which may represent a plurality of checkpoints) is created and is the current/acting checkpoint(s). Crawling-processing batches 602, 603, 604, and 605 may be assigned to four different nodes. Before processing for all of batches 602, 603, 604, 605 are completed, the effective checkpoint(s) may remain checkpoint 1.

In one or more embodiments, once all files in the file queue have been enumerated (and processed), a new checkpoint (or a new set of checkpoints) may be created. The effective checkpoint(s) may be moved as far as possible down the timeline. For example, if all of processing files in batches 602-605 are completed, a new checkpoint 2 (which may represent a plurality of checkpoints) may be created, and the effective checkpoint(s) may be moved to checkpoint 2 (i.e., checkpoint 2 may replace checkpoint 1 as the effective checkpoint(s)). When checkpoint 2 has been created, one or more previous checkpoints created prior to checkpoint 1, such as checkpoint 0, may be discarded, for conservation of storage. In one or more embodiments, a plurality of checkpoints may be maintained in a rolling fashion, e.g., to provided additional state/history information. For example, checkpoint 1 may be retained even when the effective checkpoint(s) have been moved to checkpoint 2. In one or more embodiments, checkpoint 1 may be discarded when the effective checkpoint(s) have been moved to checkpoint 2, for saving storage.

Checkpoints may be progressively created as contiguous batches of data processing files are completed. For example, if batches 603 and 604 have been completed, while batches 602 and 605 have not been completed, the effective checkpoint(s) may remain checkpoint 1. If the crawl is suspended, and the processing of batches 602 and 605 are subsequently completed, checkpoint 2 may be created, and the effective checkpoint(s) may be moved to checkpoint 2. Batches 602-605 may be processed in various orders e.g.,(out of order) by different distributed nodes. For example, batch 602 (e.g., including a first file) is enumerated before batch 604 (e.g., including a second file) but processed after batch 604.

In one or more embodiments, frequency and/or occurrence of checkpoint creation may be controlled and/or reduced in order to reduce transaction costs associated with synchronizing checkpoint information across all nodes. For example, a checkpoint may be created only after a certain amount of files and/or data have been processed. Additionally or alternatively, a checkpoint may be created only after a certain amount of time has elapsed since the creation of the last checkpoint.

In crawling and searching, if some files or information is missing at a certain checkpoint, the crawler/search engine may go to a previous checkpoint for state information and for data pertaining to the missing files or information.

In one or more embodiments, a checkpoint may maintain only a minimum amount of state and/or history information, which may include information about outstanding items. The amount of information maintained may be controlled to conserve storage resources. Once an effective checkpoint is moved, i.e., a new checkpoint is created, at least some previous/old state and/or history information may be discarded. Advantageously, memory and/or disk space may be efficiently utilized and resource computing and/or storage resources may be conserved.

In case of interruptions, for example, caused by power outage, network outage, etc., data crawling and/or processing may start at an effective checkpoint (or a most recent checkpoint) without starting from the beginning of a job. Advantageously, efficiency may be improved. Further, computing and/or storage resources may be conserved.

7. Differential/Dynamic Crawling

Figure 7:
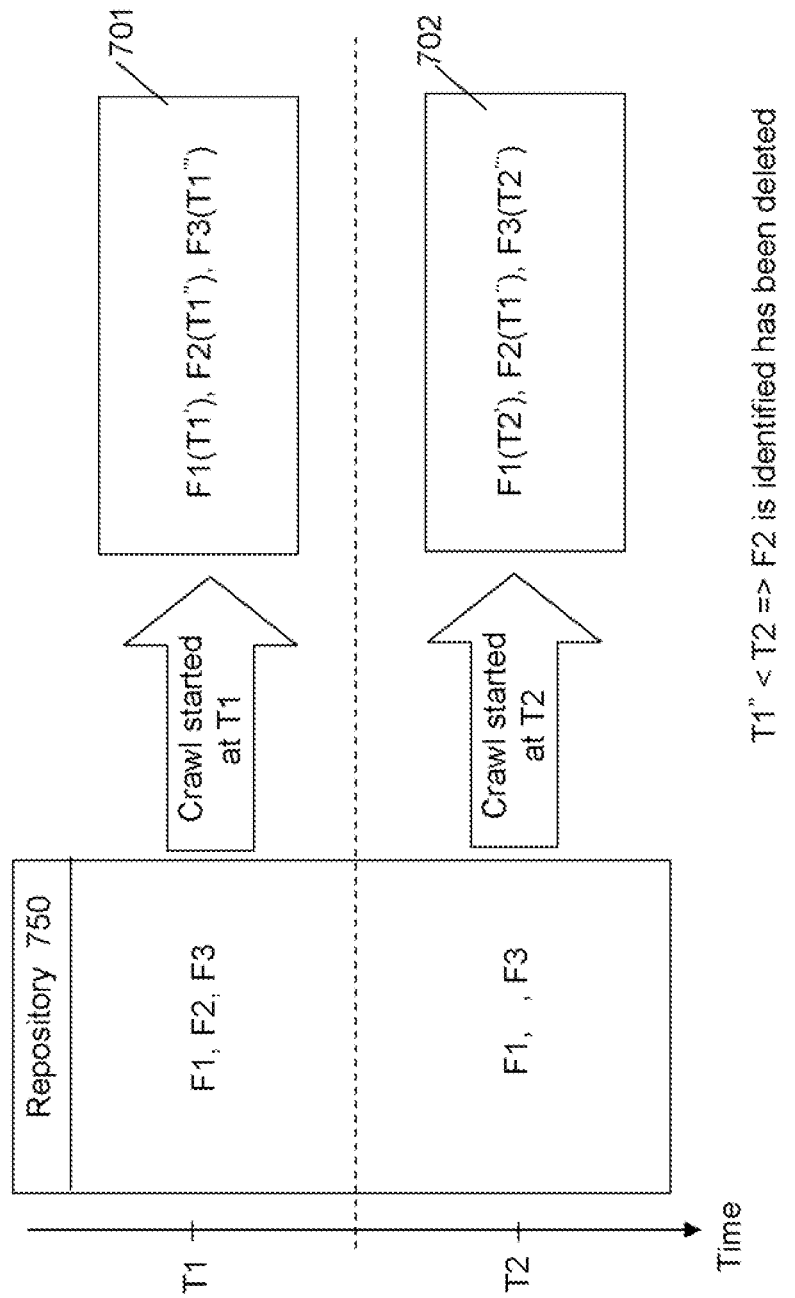
FIG. 7 illustrates a method for identifying deleted files utilizing differential crawling in accordance with one or more embodiments of the invention.

FIG. 7 illustrates a method for identifying deleted files utilizing differential crawling in accordance with one or more embodiments of the invention.

Differential crawling may represent crawling/processing only files that have not been processed and have been changed (e.g., modified or deleted) since the last crawl (or enumeration). Under the differential crawling scheme, files (or objects) that have been processed and have not been modified since the last crawl are not to be crawled (and/or processed).

Differential crawling may be based on one or more rules or combinations of rules. For example, rule 1 may include processing all files with a modification time that is greater than (i.e., later than) the last crawl time. The last crawl time may represent the time at which the last crawl started.

In another example, rule 2 may represent processing files for which metadata do not exist. For example, rule 2 may be applicable to new files. Rule 2 may also be applicable to files for which metadata have expired. For example, as illustrated in the example of FIG. 6A, for run 3, t_R2 may represent the last crawl time.

In another example, rule 3 may represent processing files for which file names are a specified file name.

The rules may be applied alone or in combination. For example, an applied rule may be rule 1 OR rule 2. Alternatively or additionally, an applied rule may be rule 1 OR rule 2 OR rule 3. Files may be skipped or processed based on one or more combinations of various rules: for example, utilizing, bullion operators (e.g., OR, AND, etc), conditional operators (e.g., IF) or set operators (e.g., inclusions, lists, etc.).

Rules may be derived from the existing metadata of the files. The metadata may include modifications, file names, etc.

Differential crawling may be applied, for example, in identifying deleted files. In general, crawling/enumeration may identify only files that exist, but cannot identify files/objects that are missing. A method for identifying deleted/missing files may include enumerating files once, thereby generating a first record/list, pertaining to the files. The method may also enumerate the files a second time and generate a second record/list, while retaining the first record/list. The method may further include comparing the second record/list and the first history/record/list. The method may further include identifying deleted files that exist in the first but not the second record/list. Accordingly, a report of deleted files may be generated. However, the method may require a substantial amount of computing resources. For example, if there are N files/objects, 2N operations may be required.

In accordance with one or more embodiments of the present invention, the method for identifying deleted files may include adding, utilizing a crawler or a job manager, a parameter, for example, "last seen time" for the context data for each of the files/objects. The "last seen time" may represent the current time or the crawl start time, e.g., t_R2 shown in the example of FIG. 6A. The method may further include capturing/recording the "last seen time" for all the files that are seen (e.g., skipped or processed) during enumeration. Files that have a "last seen time" that is less than (i.e., earlier than) latest crawl start time may be identified as deleted files.

In the example of FIG. 7, repository 750 may contain files F1, F2, and F3 at time T1. A crawl started at T1 may identify context data 701 of files F1, F2, and F3. The context data of files F1, F2, and F3 may include "last seen times" T1', T1", and T1'", respectively. The "last seen times" T1', T1", and T1'" may be later than (or greater than) T1.

At time T2, repository 750 may contain files F1 and F3, but not F2, given that file F2 has been deleted. A crawl started at time T2 may identify context data 702 of files F1, F2, and F3. Context data 702 may include "last seen times" T2', T1", and T1'" for files F1, F2, and F3, respectively. The "last seen times", T2' and T2'", may be later than (or greater than) T2. However, T1" is earlier than (or less than) T2. However, the "last seen time" T1" associated with file F2 is earlier than (or less than) T2. Accordingly, file F2 may be identified as a deleted file.

A report pertaining to deleted files may be generated and subsequent actions may be taken based on the report. Advantageously, efficiency may be improved for identifying deleted files utilizing the method in accordance with one or more embodiments of the present invention.

As can be appreciated from the foregoing, embodiments of the invention may be able to effectively crawl (or enumerate) data that have heterogeneous attributes. Embodiments of the present invention may improve efficiency in crawling and/or processing data, with reduced response time and completion time, and with minimized delay and resource utilization caused by interruptions. Embodiments of the invention may conserve computing and/or storage resources.

While this invention has been described in terms of several embodiments, there are alterations, permutations, and equivalents, which fall within the scope of this invention. It should also be noted that there are many alternative ways of implementing the methods and apparatuses of the present invention. Furthermore, embodiments of the present invention may find utility in other applications. The abstract section is provided herein for convenience and, due to word count limitation, is accordingly written for reading convenience and should not be employed to limit the scope of the claims. It is therefore intended that the following appended claims be interpreted as including all such alterations, permutations, and equivalents as fall within the true spirit and scope of the present invention.

What is claimed is:

1. A method for handling a plurality of files, the method comprising:

receiving a service request comprising a filter to exclude a portion of the plurality of files from processing;

enumerating at least a portion of the files not excluded by the filter using at least one crawler of a set of crawlers, the set of crawlers including a first crawler and a second crawler, wherein enumerating includes using the first crawler or the second crawler to determine a number of files in the portion of the files not excluded by the filter and to determine an amount of processing work to process the number of files in the portion of the files not excluded by the filter;

identifying a first set of files of the portion of the files not excluded by the filter;

excluding the first set of files from a second set of files, the second set of files to be processed, the second set of files including a first batch of the files and a second batch of the files;

submitting a first set of file identifiers associated with the first batch to a first queue;
spawning a first set of service providers in a first set of nodes according to first workload associated with the first queue;
processing, using the first set of service providers, the first batch of the portion of the files not excluded by the filter;
submitting a second set of file identifiers associated with the second batch to at least one of the first queue and a second queue;
spawning a second set of service providers in a second set of nodes according to second workload associated with the at least one of the first queue and the second queue; and
processing, using the second set of service providers, the second batch of the portion of the files not excluded by the filter.

2. The method of claim 1 further comprising:
providing a first report when the processing the first batch of files is completed; and
providing a second report when the processing the second batch of files is completed.

3. The method of claim 1 further comprising:
saving a state pertaining to the handling the plurality of files when all of the at least the portion of the files have been processed, the state includes at least information pertaining to a restart path for processing the at least the portion of the files.

4. The method of claim 1 further comprising:
grouping, according to at least a time attribute, the plurality of files into a plurality of time interval file groups, the plurality of time interval file groups including at least a first time interval file group associated with a first time interval and a second time interval file group associated with a second time interval.

5. The method of claim 4 wherein the time attribute represent at least one of a creation time, a modification time, an access time, and a retention time.

6. The method of claim 4 wherein the first time interval and the second time interval have different lengths.

7. The method of claim 4 further comprising:
using the first crawler to enumerate at least the first time interval file group; and
using the second crawler to enumerate at least the second time interval me group.

8. The method of claim 4 wherein the plurality of file groups further includes a third time interval file group associated with a third time interval, the method further comprising skipping the third time interval file group without enumerating the third time interval file group.

9. The method of claim 4 further comprising:
using at least a first node of the first set of nodes to process a first set of files, the first set of files belonging to both the first batch of the files and the first time interval file group; and
using at least a second node of the first set of nodes to process a second set of files, the second set of files belonging to both the first batch of the files and the second time interval file group.

10. The method of claim 4 wherein the plurality of file groups further includes a third time interval file group associated with a third time interval, the method further comprising skipping the third time interval file group without processing the third time interval file group.

11. The method of claim 4 further comprising mapping the plurality of time interval file groups and the plurality of files into a tree structure.

12. The method of claim 1 further comprising removing one or more links among the at least the portion of the files to form a tree structure for the at least the portion of the files.

13. The method of claim 12 further comprising performing the enumerating on the tree structure.

14. The method of claim 12 further comprising:
mapping the tree structure into a list structure; and
performing the enumerating on the list structure.

15. The method of claim 12 further comprising:
segmenting the tree structure into a plurality of directories, the plurality of directories including at least a first directory and a second directory;
providing the first directory to a first node;
providing the second directory to a second node;
using the first crawler to enumerate at least a portion of the first directory; and
using the second crawler to enumerate at least a portion of the second directory.

16. The method of claim 15 further comprising:
transferring a subdirectory of the first directory from the first node to the second node; and
using the second crawler to enumerate the subdirectory of the first directory.

17. The method of claim 1 wherein the first batch of the files includes a first set of files that have changes according to one or more file system snapshots, the first batch of the files excluding a second set of files that have no changes according to the one or more file system snapshot.

18. The method of claim 17 wherein the changes include at least one change in at least one directory name pertaining to at least one file in the first set of files.

19. The method of claim 1 wherein the first set of identifiers represents changes in the first batch of the files according to one or more file system snapshots.

20. The method of claim 1 further comprising:
creating a first checkpoint when a first set of files has been processed, the first checkpoint representing first state information pertaining to the at least the portion of the files;
creating a second checkpoint when the first set of files and a second set of files have been processed, the second checkpoint representing second state information pertaining to the at least the portion of the files; and
replacing the first checkpoint with the second checkpoint as an effective checkpoint for the at least the portion of the files.

21. The method of claim 20 further comprising discarding a previous checkpoint after the second checkpoint has been created, the previous checkpoint created prior to creation of the first checkpoint.

22. The method of claim 20 further comprising retaining the first checkpoint after the second checkpoint has been created.

23. The method of claim 20 further comprising discarding the first checkpoint after the second checkpoint has been created.

24. The method of claim 20 further comprising maintaining a plurality of checkpoints in a rolling fashion.

25. The method of claim 20 wherein the second set of files includes a first file and a second file, the first file enumerated before the second file, the first file processed after the second file.

26. The method of claim 25 wherein the first file and the second file are processed by different nodes.

27. The method of claim 20 wherein the first set of files represents a set of contiguous batches of files.

28. The method of claim 20 further comprising synchronizing the first check point across a plurality of nodes, the plurality of nodes including at least the first set of nodes and the second set of nodes.

29. The method of claim 1 wherein the one or more rules include that each file in the first set of files has not been changed since a previous enumeration of the at least the portion of the files.

30. The method of claim 1 wherein the one or more rules include at least a rule requiring that each file in the first set of files has been processed since a previous enumeration of the at least the portion of the files.

31. The method of claim 1 wherein the one or more rules include at least a rule requiring that each file in the first set of files has no effective metadata.

32. The method of claim 1 wherein the one or more rules include at least a rule requiring that each file in the first set of files has a specific file name.

33. The method of claim 1 further comprising adding a parameter for context data associated with each file of the plurality of files for facilitating the identifying.

34. The method of claim 33 wherein the parameter represents a last seen time.

35. The method of claim 1 further comprising:
stopping the enumerating;
finishing processing all files in the first queue; and
creating a checkpoint, the checkpoint representing state information pertaining to the at least the portion of the files.

36. The method of claim 35 further comprising resuming the enumerating from the checkpoint.

37. The method of claim 1 further comprising:
stopping the enumerating;
saving a checkpoint after the stopping, the checkpoint representing state information pertaining to the at least the portion of the files;
discarding all files in a third queue;
continuing the enumerating from the checkpoint; and
submitting a third set of identifiers associated with a third batch of the files to the third queue.

38. A computer program product, comprising a computer usable medium having a computer readable program code embodied therein, the computer readable program code adapted to be executed to implement a method for handling a plurality of files, the method comprising:
a set of queues including at least a first queue and a second queue;
a job manager configured to receive a service request comprising a filter to exclude a portion of the files from being processed;
a set of crawlers configured to:
enumerate at least a portion of the files not excluded by the filter, the set of crawlers including at least a first crawlers and a second crawler, the set of crawlers further configured to determine a number of files in the portion of the files not excluded by the filter and to determine an amount of processing work to process the number of files in the portion of the files not excluded by the filter;
identifying a first set of files of the portion of the files not excluded by the filter;
excluding the first set of files from a second set of files, the second set of files to be processed, the second set of files including a first batch of the files and a second batch of the files;
submit a first set of file identifiers associated with the first batch of the files to the first queue; and
submit a second set of file identifiers associated with the second batch of the files to at least one of the first queue and the second queue;
a first set of nodes configured to spawn a first set of service providers according to first workload associated with the first queue, the first set of service providers configured to process the first batch of the files; and
a second set of nodes configured to spawn a second set of service providers according to second workload associated with the at least one of the first queue and the second queue, the second set of service providers configured to process the second batch of the files.

39. The computer program product of claim 38 wherein the first set of nodes is further configured to provide a first report after processing of the first batch of files has been completed, and the second set of nodes is further configured to provide a second report after processing of the second batch of files has been completed.

40. The computer program product of claim 38 further comprising a job manager configured to save a state pertaining to the plurality of files when all of the at least the portion of the files have been processed, the state includes at least information pertaining to a restart path for processing the at least the portion of the files.

41. The computer program product of claim 38 further comprising a job manager configured to group, according to at least a time attribute, the plurality of files into a plurality of time interval file groups, the plurality of time interval file groups including at least a first time interval file group associated with a first time interval and a second time interval file group associated with a second time interval.

42. The computer program product of claim 41 wherein the time attribute represents at least one of a creation time, a modification time, a access time, and a retention time.

43. The computer program product of claim 41 wherein the first time interval and the second time interval have different lengths.

44. The computer program product of claim 41 wherein:
the first crawler is configured to enumerate at least the first time interval file group; and
the second crawler is configured to enumerate at least the second time interval file group.

45. The computer program product of claim 41 wherein the plurality of file groups further includes a third time interval file group associated with a third time interval, the set of crawlers further configured to skip the third time interval file group without enumerating the third time interval file group.

46. The computer program product of claim 41 wherein the first set of nodes includes at least a first node and a second node, the first node configured to process a first set of files, the first set of files belonging to both the first batch of the files and the first time interval file group, the second node configured to process a second set of files, the second set of files belonging to both the first batch of the files and the second time interval file group.

47. The computer program product of claim 41 wherein the plurality of file groups further includes a third time interval file group associated with a third time interval, the third time interval file group configured to be skipped without being processed.

48. The computer program product of claim 41 wherein the job manager is further configured to map the plurality of time interval file groups and the plurality of files into a tree structure.

49. The computer program product of claim 38 further comprising a job manager, the job manger configured to remove one or more links among the at least the portion of the files to form a tree structure for the at least the portion of the files.

50. The computer program product of claim 49 wherein the set of crawlers is further configured to enumerate the at least a portion of the files according to the tree structure.

51. The computer program product of claim 49 wherein the job manager is further configured to map the tree structure into a list structure, the set of crawlers further configured to enumerate the at least a portion of the files according to the list structure.

52. The computer program product of claim 49 wherein the job manager is further configured to segment the tree structure into a plurality of directories, the plurality of directories including at least a first directory and a second directory, the job manager further configured to provide the first directory to a first node and to provide the second directory to a second node, the first crawler configured to enumerate at least a portion of the first directory, the second crawler configured to enumerate at least a portion of the second directory.

53. The computer program product of claim 52 wherein the job manager is further configured to transfer a subdirectory of the first directory from the first node to the second node, the second crawler further configured to enumerate the subdirectory of the first directory.

54. The computer program product of claim 38 wherein the first batch of the files includes a first set of the files that have changes according to one or more file system snapshots, the first batch of the files excluding a second set of files that have no changes according to the one or more file system snapshots.

55. The computer program product of claim 54 wherein the changes include at least one change in at least one directory name pertaining to at least one file in the first set of files.

56. The computer program product of claim 38 wherein the first set of identifiers represents changes in the first batch of the files according to one or more file system snapshots.

57. The computer program product of claim 38 further comprising a job manager, the job manager configured to create a first checkpoint when a first set of files has been processed, the first checkpoint representing first state information pertaining to the at least the portion of the files, the job manager further configured to create a second checkpoint when the first set of files and a second set of files have been processed, the second checkpoint representing second state information pertaining to the at least the portion of the files, the job manager further configured to replace the first checkpoint, with the second checkpoint as an effective checkpoint for the at least the portion of the files.

58. The computer program product of claim 57 wherein the job manager is further configured to discard a previous checkpoint after the second checkpoint has been created, the previous checkpoint created prior to creation of the first checkpoint.

59. The computer program product of claim 57 wherein the job manager is further configured to retain the first checkpoint after the second checkpoint has been created.

60. The computer program product of claim 57 wherein the job manager is further configured to discard the first checkpoint after the second checkpoint has been created.

61. The computer program product of claim 57 wherein the job manager is further configured to maintain a plurality of checkpoints in a rolling fashion.

62. The computer program product of claim 57 wherein the second set of files includes a first file and a second file, the first file enumerated before the second file, the first file processed after the second file.

63. The computer program product of claim 62 wherein the first file and the second file are processed by different nodes.

64. The computer program product of claim 57 wherein the first set of files represents a set of contiguous batches of files.

65. The computer program product of claim 57 wherein the job manager is further configured to synchronize the first check point across a plurality of nodes, the plurality of nodes including at least the first set of nodes and the second set of nodes.

66. The computer program product of claim 38 wherein the one or more rules include at least a rule requiring that each file in the first set of files has not been changed since a previous enumeration of the at least the portion of the files.

67. The computer program product of claim 38 wherein the one or more rules include at least a rule requiring that each file in the first set of files has been processed since a previous enumeration of the at least the portion of the files.

68. The computer program product of claim 38 wherein the one or more rules include at least a rule requiring that each file in the first set of files has no effective metadata.

69. The computer program product of claim 38 wherein the one or more rules include at least a rule requiring that each file in the first set of files has a specific file name.

70. The computer program product of claim 38 wherein the set of crawlers is further configured to add a parameter for context data associated with each file of the plurality of files for facilitating identification of the first set of files.

71. The computer program product of claim 70 wherein the parameter represents a last seen time.

* * * * *